US007222863B2

(12) United States Patent
Deal et al.

(10) Patent No.: US 7,222,863 B2
(45) Date of Patent: May 29, 2007

(54) WHEEL SUPPORT DEVICE WITH THREE PIVOTS, SUSPENSION DEVICE AND VEHICLE COMPRISING SAID SUPPORT DEVICE

(75) Inventors: Michel Deal, Saint-Rémy-En-Rollat (FR); Alain Vaxelaire, Romagnat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/167,986

(22) Filed: Jun. 27, 2005

(65) Prior Publication Data

US 2005/0236797 A1 Oct. 27, 2005

Related U.S. Application Data

(63) Continuation of application No. PCT/EP03/14937, filed on Dec. 29, 2003.

(30) Foreign Application Priority Data

Dec. 27, 2002 (FR) .................................. 02 16947

(51) Int. Cl.
   *B60G 3/26* (2006.01)
(52) U.S. Cl. ........................... 280/5.521; 280/124.135; 280/124.5; 280/86.757
(58) Field of Classification Search ............. 280/5.52, 280/5.521, 86.751, 86.757, 124.135, 124.136, 280/124.138, 124.139, 124.15
   See application file for complete search history.

(56) References Cited

U.S. PATENT DOCUMENTS 3,137,513 A * 6/1964 Marot .................. 280/124.103

| | | | |
|---|---|---|---|
| 5,346,241 A | 9/1994 | Lee | |
| 5,431,429 A * | 7/1995 | Lee | 280/124.139 |
| 5,451,073 A | 9/1995 | Inoue | |
| 5,620,199 A * | 4/1997 | Lee | 280/5.521 |
| 5,700,025 A * | 12/1997 | Lee | 280/86.751 |
| 5,984,330 A * | 11/1999 | Hasshi et al. | 280/124.146 |
| 6,170,838 B1 * | 1/2001 | Laurent et al. | 280/5.508 |
| 6,688,620 B2 * | 2/2004 | Serra et al. | 280/124.135 |
| 2001/0035623 A1 | 11/2001 | Wagner | |
| 2003/0011157 A1 | 1/2003 | Aubarede et al. | |
| 2003/0071430 A1 | 4/2003 | Serra et al. | |
| 2005/0051976 A1 | 3/2005 | Blondelet et al. | |

FOREIGN PATENT DOCUMENTS

| | | | |
|---|---|---|---|
| EP | 1 232 852 A | | 8/2002 |
| EP | 1 275 534 A | | 1/2003 |
| FR | 937 309 A | | 8/1948 |
| FR | 2 806 693 | * | 9/2001 |
| WO | WO 01/72572 A | | 10/2001 |
| WO | WO 00/16998 A | | 3/2002 |
| WO | WO 02/058949 A | | 8/2002 |

\* cited by examiner

*Primary Examiner*—Ruth Ilan
(74) *Attorney, Agent, or Firm*—Cohen Pontani Lieberman & Pavane LLP

(57) ABSTRACT

A wheel support system (3, 5, 6) designed to connect a wheel to suspension elements (4) of a vehicle. The wheel support system includes a curved slide (6) or two levers (54, 55) which confer upon the wheel carrier (3) a degree of camber freedom relative to the suspension elements (4), and a triple hinge (5, 51) that operates along three essentially longitudinal axes. The triple hinge (5, 51) is connected on the one hand to the wheel carrier (3) and on the other hand to the suspension elements (4).

10 Claims, 11 Drawing Sheets

US 7,222,863 B2

WHEEL SUPPORT DEVICE WITH THREE PIVOTS, SUSPENSION DEVICE AND VEHICLE COMPRISING SAID SUPPORT DEVICE

RELATED APPLICATIONS

This is a continuation of International Application No. PCT/EP2003/014937, filed on Dec. 29, 2003, which claims priority from French Patent Application No. 02/16947, filed on Dec. 27, 2002, the content of which is hereby incorporated by reference.

FIELD OF THE INVENTION

The present invention concerns the ground contact system of vehicles, in particular suspension and wheel support systems that allow a degree of freedom of the wheel camber relative to the suspension elements. The term "ground contact system" covers all the elements and functions involved, that are active or which influence the relation between the body of the vehicle and the ground over which it moves. Thus, in particular, the following elements are part of the ground contact system: tyre, wheel, wheel bearing, wheel support, braking components, suspension elements (arm, wishbone, strut, etc.), springs, dampers, joints, anti-vibration components, anti-roll systems, anti-locking systems, anti-skid systems, steering system and stability control system.

BACKGROUND OF THE INVENTION

International application WO 01/72572 describes a wheel support system which allows a degree of wheel camber freedom relative to the suspension elements. This degree of freedom is controlled either actively, for example by a jack as a function of running parameters of the vehicle, or passively by the forces exerted on the wheel in the contact area.

The European patent application published under number EP 1232852 also concerns such systems and, to guide the camber movement of the wheel, proposes the use of an element which pivots about an essentially vertical axis articulated between the wheel support and the suspension elements.

The European patent application filed under number EP 02/013797.2 also concerns such systems and proposes to use a curved slide to guide the camber movement of the wheel support relative to the suspension elements.

One of the difficulties met in the design of these systems stems from the fact that large forces have to be transmitted from the road to the body (and vice-versa) via the ground contact system and in particular the tyre, the wheel support and the suspension. These forces produce large mechanical stresses with all the consequences that follow for the steering precision of the wheel and for the reliability of the systems. Viewed from the body of the vehicle, the forces transmitted by the road are generally expressed as follows: a transverse force (horizontal and perpendicular to the wheel plane), a longitudinal force (horizontal and parallel to the wheel plane, a vertical force, a torque known as the "spin" torque (around the axis of the wheel), a torque known as the "overturning" torque (around the longitudinal axis) and a torque known as the "self-alignment" torque (around the vertical axis). Besides these forces transmitted by the road, the wheel also transmits to the body forces stemming from the inertial forces imposed upon it, in particular the centrifugal force acting around curves.

In the support and suspension systems described in the patent applications cited earlier, an extra degree of freedom has been added compared with conventional suspension systems to allow a camber movement of the wheel relative to the body. This extra mobility can be provided in several different ways but they all have in common that increasing the number of components and joints or pivots tends to reduce the rigidity and/or robustness of the system as a whole. Moreover, it is difficult to compensate this rigidity deficit by increasing the cross-section of the various elements because the space available is generally restricted. In effect, such variable-camber suspensions should preferably not interfere with the compromises established in the context of space occupied (the term "packaging" is also used).

One problem with such systems is therefore to perfect their rigidity, in particular against the longitudinal force and the self-alignment and spin torques.

Another problem that can arise, especially in the systems described in EP 1232852, is the undesirable influence of certain types of force on the camber and particularly on the steering of the wheel plane.

SUMMARY OF THE INVENTION

One object of the invention is to overcome at least some of the above drawbacks.

This and other objects are attained in accordance with one aspect of the invention directed to a support system designed to connect a wheel to suspension elements of a vehicle. This support system comprises camber means which confer upon the wheel support a degree of camber freedom relative to the suspension elements. A triple hinge is provided that works along at least three essentially longitudinal axes and is connected on the one hand to the wheel support and on the other hand to the suspension elements.

The invention also concerns a suspension system and a vehicle comprising the support system according to the invention.

DETAILED DESCRIPTION OF THE DRAWINGS

In the various figures, identical or similar elements are indexed with the same numbers. Thus, their description is not repeated systematically.

Figure 1:
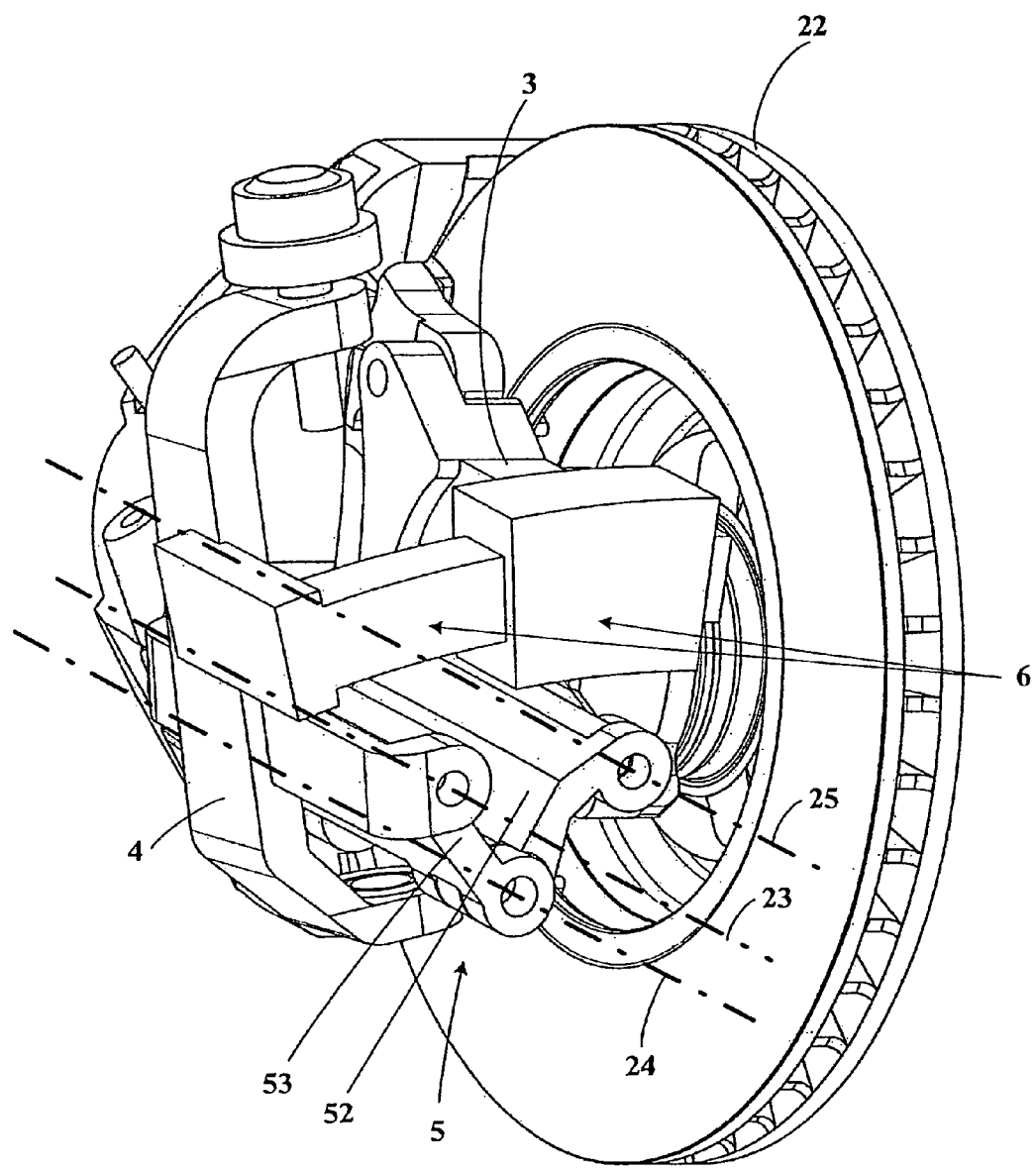
FIG. 1: Perspective view of an embodiment of the support system according to the invention.

FIG. 1 shows a (partial) view of a suspension system according to the invention. To illustrate the invention better, the wheel itself is not shown. The brake disc 22 enables the position of the various components to be seen. The intermediate support 4 is designed to be connected to the other suspension elements in a manner known as such and not illustrated here. According to the invention, the wheel support 3 or carrier is connected to the intermediate support 4 by means which ensure two substantially independent functions. The first of these functions is a (planar) connection implemented by a "triple hinge" 5. The triple hinge 5 is articulated along three axes: an inner axis 23 around which an inner flange 53 is articulated relative the intermediate support 4, an outer axis 25 around which an outer flange 52 is articulated relative to the wheel support 3, and a central axis 24 around which the inner 53 and outer 52 flanges are articulated relative to one another. These axes are essentially longitudinal, i.e. horizontal and parallel to the wheel plane. This connection allows the wheel support 3 to move relative to the intermediate support 4 in the camber plane while effectively preventing any relative rotation about the vertical and the horizontal axes. The second function is to control the movements of the wheel support relative to the suspension elements in the camber plane. In the present example this second function is ensured by a curved slide 6 also arranged between the wheel support and the intermediate support 4. Since the longitudinal force and the self-alignment and rolling torques are taken up in large part by the triple hinge 5, the stresses transmitted by the slide 6 are lower than in the systems described for example in EP 02/013797.2. This at the same time allows the said slide to be of simpler and lighter design, while the rigidity of the system as a whole is better especially against the self-alignment and spin torques. The camber movement of the wheels relative to the intermediate support 4 takes place around an axis whose position is defined by the geometry of the slide 6. Slides with different configurations can be used, as described in EP 02/0 13797.2. Of course, the rotation axis defined by the slide must be compatible with the orientation of the axes of the triple hinge 5. For example, this compatibility is ensured when the axes of the triple hinge and that defined by the slide are all parallel to one another.

Figure 2:
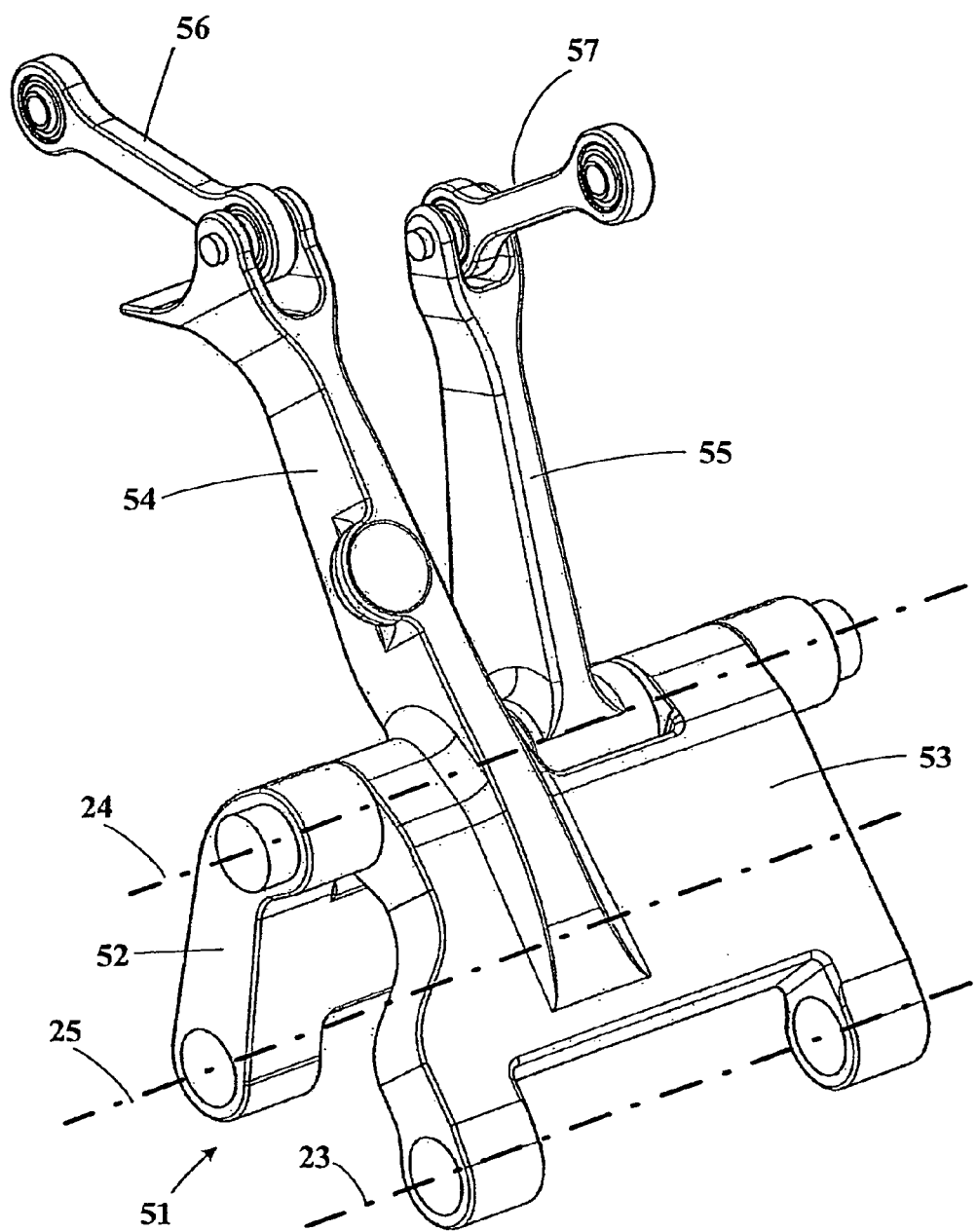
FIG. 2 Perspective view of an embodiment of the triple hinge of the system according to the invention.

FIG. 2 shows part of a preferred embodiment of the invention. This is a triple hinge 51 which carries out the first connecting function described for the triple hinge (5) in FIG. 1 and which also provides the second function, that of guiding the camber, whereas the latter is taken up separately by the slide (6) in FIG. 1. Here, the triple hinge 51 is arranged with its central axis 24 at the top whereas in the device of FIG. 1 it is at the bottom. The guiding function in the camber plane is carried out by means of levers 54 and 55 attached respectively to the flanges 53 and 52 of the triple hinge 51. Rods 56 and 57 are provided to connect the upper ends of the levers 54 and 55 on the one hand to the wheel support and on the other hand to the intermediate support (neither shown here). Thus, the upper part of the device shown here replaces the slide (6) in the system of FIG. 1 so far as the camber movement guiding function is concerned. The triple hinge 51 and its levers 54 and 55 behave as a pair of scissors interposed between the wheel support and the suspension elements.

Figure 3:
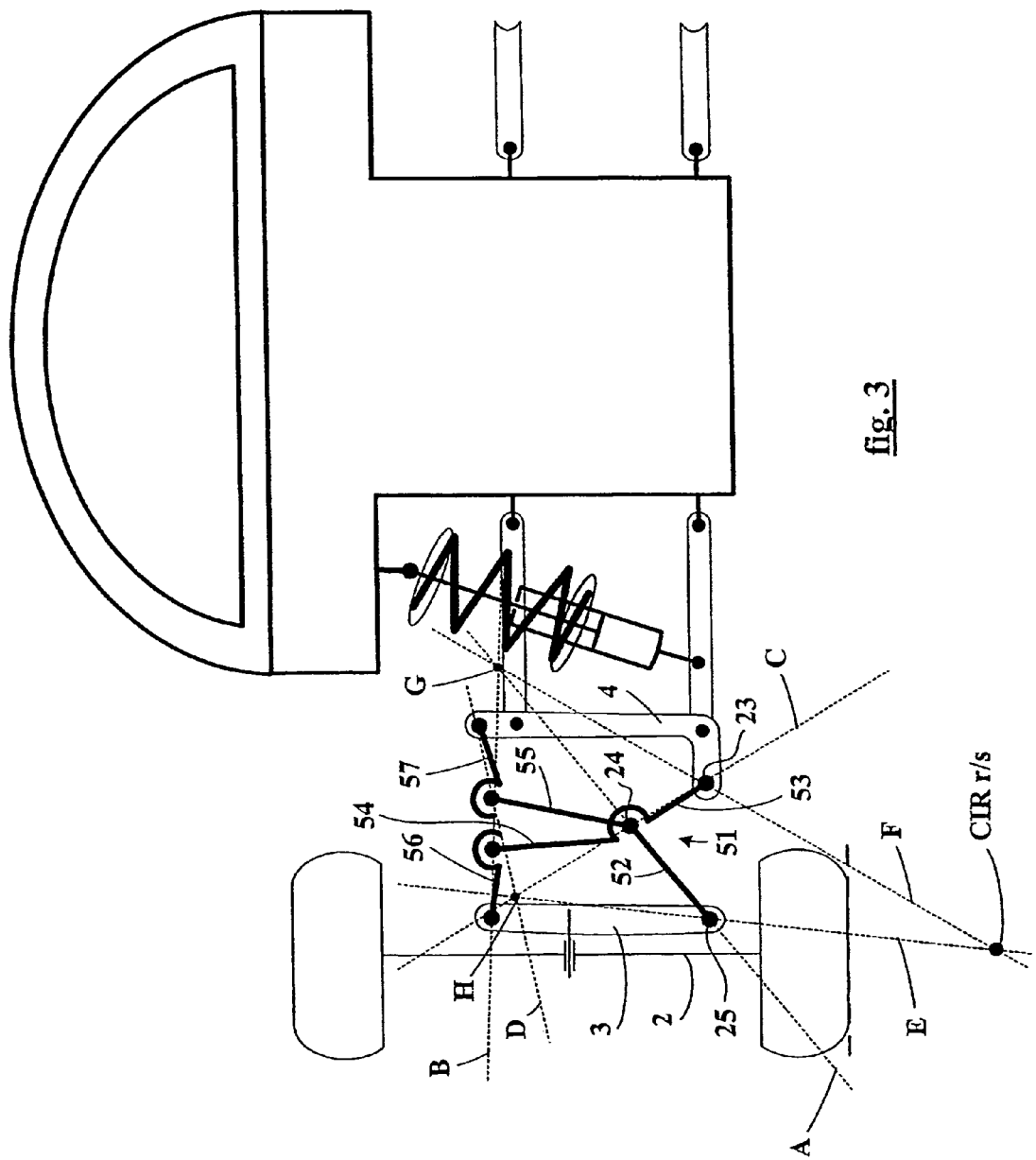
FIG. 3: Schematic plan view of a vehicle according to the invention.

FIG. 3 shows schematically the kinematic principle of the system of FIG. 2 applied to a vehicle equipped for example with a double-wishbone suspension. As described above the triple hinge 51 extended by the levers 54 and 55 connects the wheel support 3 to the intermediate support 4 via the rods 56 and 57. It is clear from the figure that the assembly consisting of the triple hinge 51 and the levers 54 and 55, by operating in the manner of a pair of scissors, determines the kinematics of the wheel support 3 and the wheel 2 relative to the intermediate support 4. The latter is connected to the other suspension elements (arms, wishbones, springs) in a manner known as such so as to allow essentially vertical suspension movements.

The position of the instantaneous centre of rotation (CIR r/s) of the wheel 2 (and the wheel support 3) in the camber plane relative to the intermediate support 4 can be determined as follows: first, the intersection (G) of the line A, corresponding to the orientation of the outer flange 52 of the triple hinge 51, with the line B, corresponding to the orientation of the outer rod 56, is determined; then, the intersection (H) of the line C, corresponding to the orientation of the inner flange 53 of the triple hinge 51, with the line D, corresponding to the orientation of the inner rod 57, is determined; then the line E, which joins the intersection of the lines C and D (i.e. the point H) and the pivot (the outer axis 25) of the outer flange 52 on the wheel support 3, and the line F, which joins the intersection of the lines A and B (i.e. the point G) and the pivot (the inner axis 23) of the inner flange 53 on the intermediate support 4, are constructed; the instantaneous centre of rotation (CIR r/s) of the camber movement of the wheel 2 relative to the intermediate support 4 is then at the intersection of the lines E and F. It is understood that the position of the instantaneous centre of rotation is the consequence of the combination of the geometrical characteristics of the numerous components of the system. In this particular example and in the vertical wheel position shown, the instantaneous centre of rotation is below ground level, which is to say that passive operation controlled by the transverse forces is possible. Moreover, in the mean position of the wheel, the instantaneous centre of rotation is located essentially in the wheel plane and this is a preferred embodiment of the invention. The reader is invited to see application WO 01/72572 for details about the effects of the position of the instantaneous centre of rotation.

The mean position of the wheel corresponds to the case when the suspension system is carrying the rated load of the vehicle and the camber angle of the wheel corresponds to rolling in a straight line. In general this camber angle is very small, so that it can be assimilated to zero camber (i.e. to the case of a perfectly vertical wheel).

Figure 4:
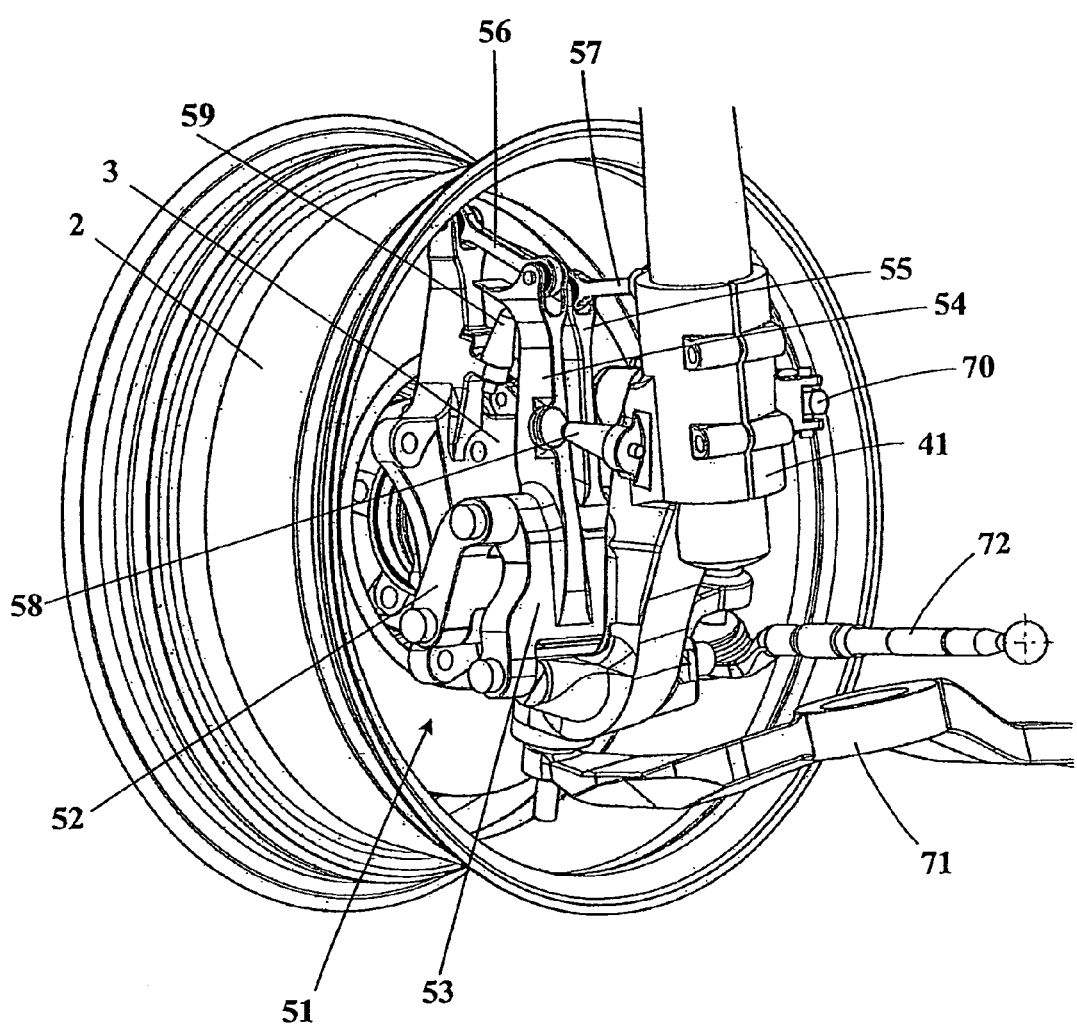
FIG. 4: Perspective view of an embodiment of the suspension system according to the invention.

FIG. 4 shows an embodiment of the suspension system of the invention that incorporates the system described in particular in FIG. 2. In this example it is based on a MacPherson suspension known as such. The force strut 41 is guided relative to the body by its upper attachment (not shown), by a lower wishbone 71 and by a steering rod 72. Here, the lower end of the force strut 41 plays the part of the intermediate support (4) in the previous figures. According to the invention, the longitudinal force and the self-alignment and spin torques are taken up by the triple hinge 51. The stresses transmitted by the levers 54 and 55 are low because they concern only the camber torque and a (small) part of the transverse forces. Comparing the structure described here with that of FIG. 2 of the international application WO 01/72572, it is easy to understand the contribution of the invention toward stiffness. Moreover, as will be seen below, this system also allows great freedom of design and adjustment of the kinematic definition of the movement in the camber plane.

Camber abutments (58, 59) can be used to restrict the range of the camber movements. In this preferred example a counter-camber abutment 58 is positioned between the inner lever 54 and the force strut 41, and a camber abutment 59 between the inner lever 54 and the wheel support 3. Besides their movement-restricting function the abutments can also influence the passive behaviour of the system in a useful way. In effect, their shape and dimensions can introduce stiffness and damping that vary as a function of the camber deflection. These abutments are preferably made of an elastomer material such as rubber.

The rods 56 and 57 can comprise means for varying their length, for example to enable the kinematic definition described in FIG. 3 to be modified.

A camber damper 70 (the end of whose shaft can be seen) can for example be arranged between the strut 41 and the wheel support, to provide additional means for influencing the passive behaviour of the support device according to the invention. Alternatively an active element such as a jack (for example hydraulic, pneumatic or electric) can enable active control of the camber.

Figure 5:
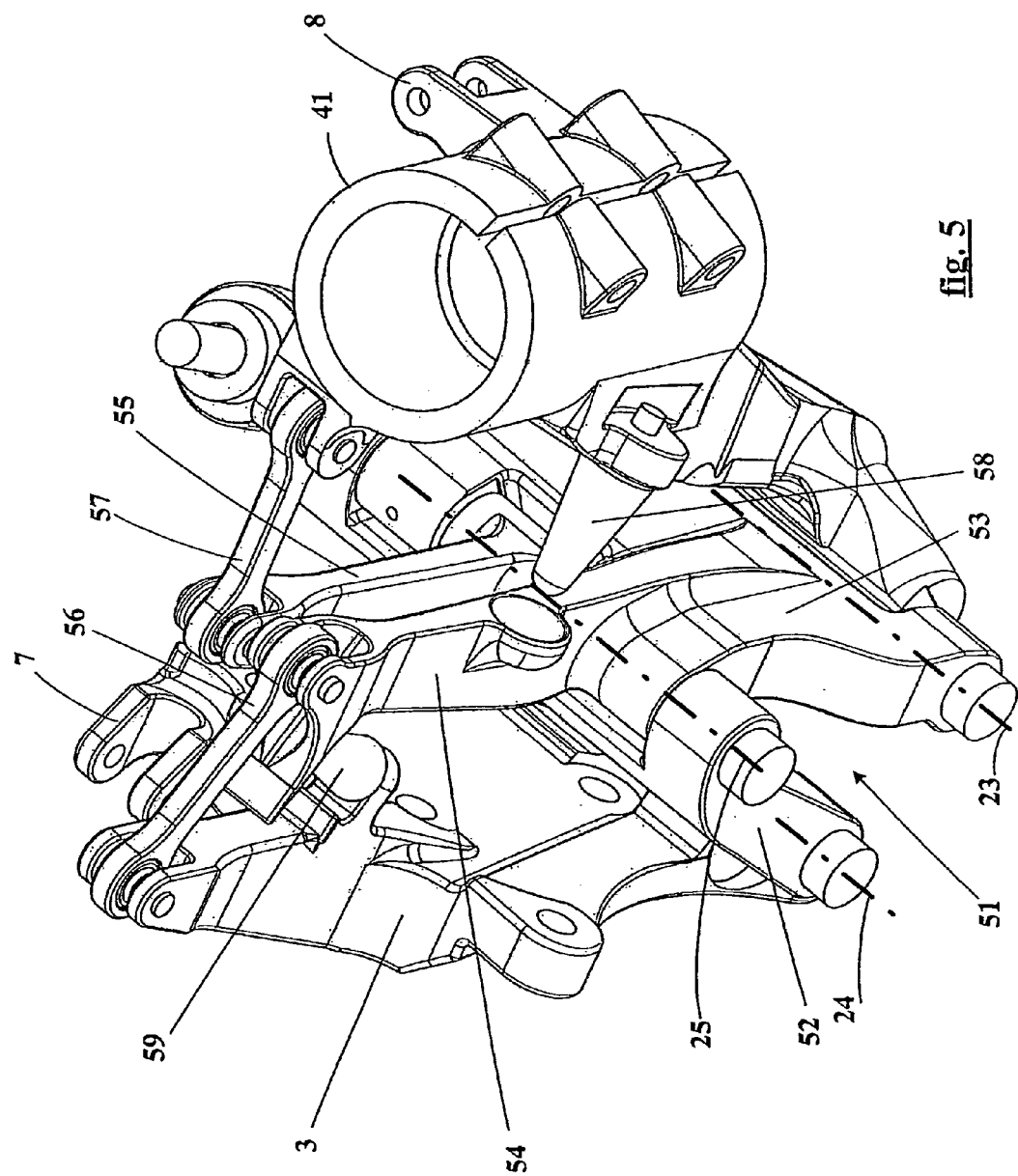
FIG. 5: Perspective view of part of the embodiment in FIG. 4.

FIG. 5 is a view of the system of FIG. 4 from a different angle. In this view the wheel, the lower wishbone, the upper part of the strut, the track rod and the camber damper have been omitted for the sake of clarity. It is thus easier to see in particular the axes 23, 24 and 25 of the triple hinge 51, the progressive abutments 58 and 59, and the brackets 7 (on the wheel support) and 8 (on the force strut) designed to receive a damper or a camber actuator.

Figure 7:
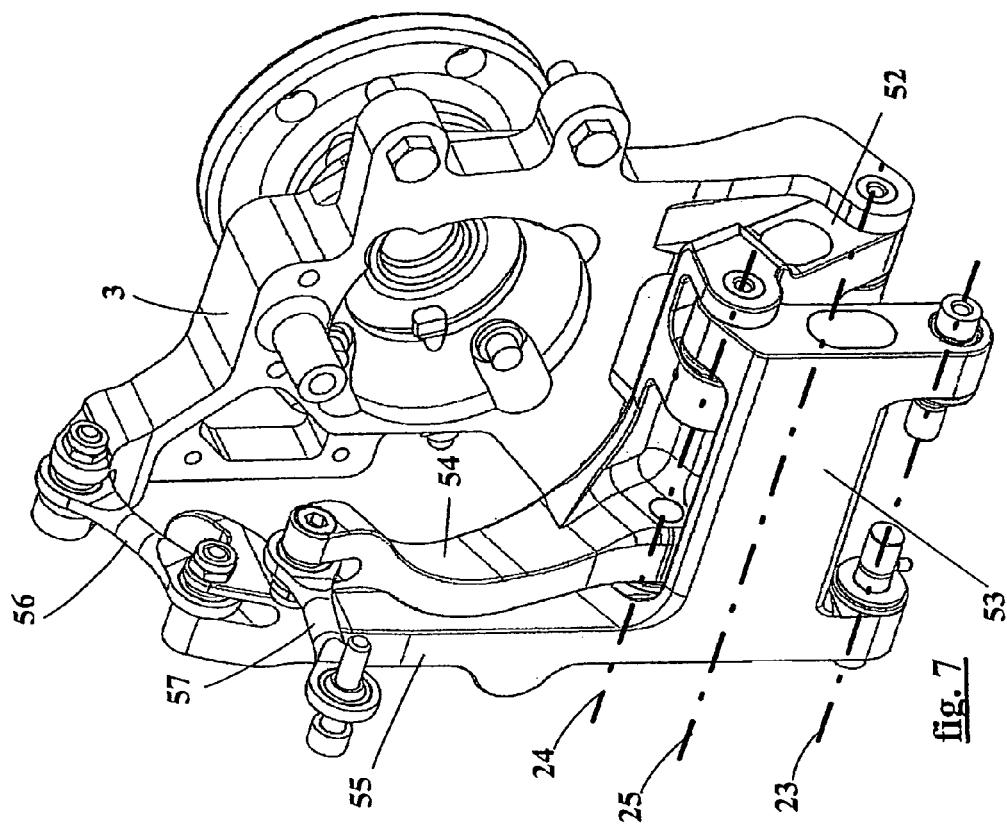
FIGS. 6 and 7: Perspective views of another embodiment of the system according to the invention.
Figure 6:
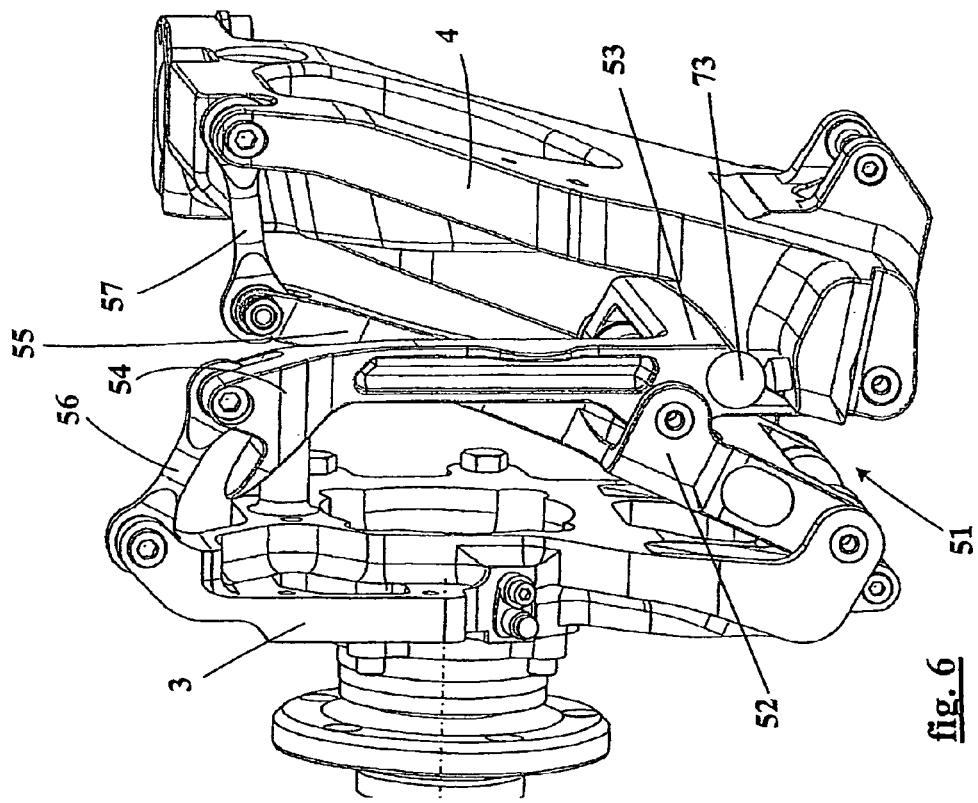

FIGS. 6 and 7 are two views of another embodiment of the support system according to the invention, designed more particularly for the suspension of a driving axle, preferably the rear axle of a vehicle. The main difference between this embodiment and that of FIGS. 2, 4 and 5 is that the passage of a transmission (itself not shown here) is made possible by a particular arrangement. A hollow is provided in the intermediate support 4 (see FIG. 6, not shown in FIG. 7) and in the wheel support 3 (see FIG. 7). The levers 54 and 55 are also offset for the same purpose (see FIG. 7). In this example the intermediate support 4 is designed to be connected to the vehicle body by a pair of wishbones and a track-rod (connected via the ball joint 73).

Figure 8:
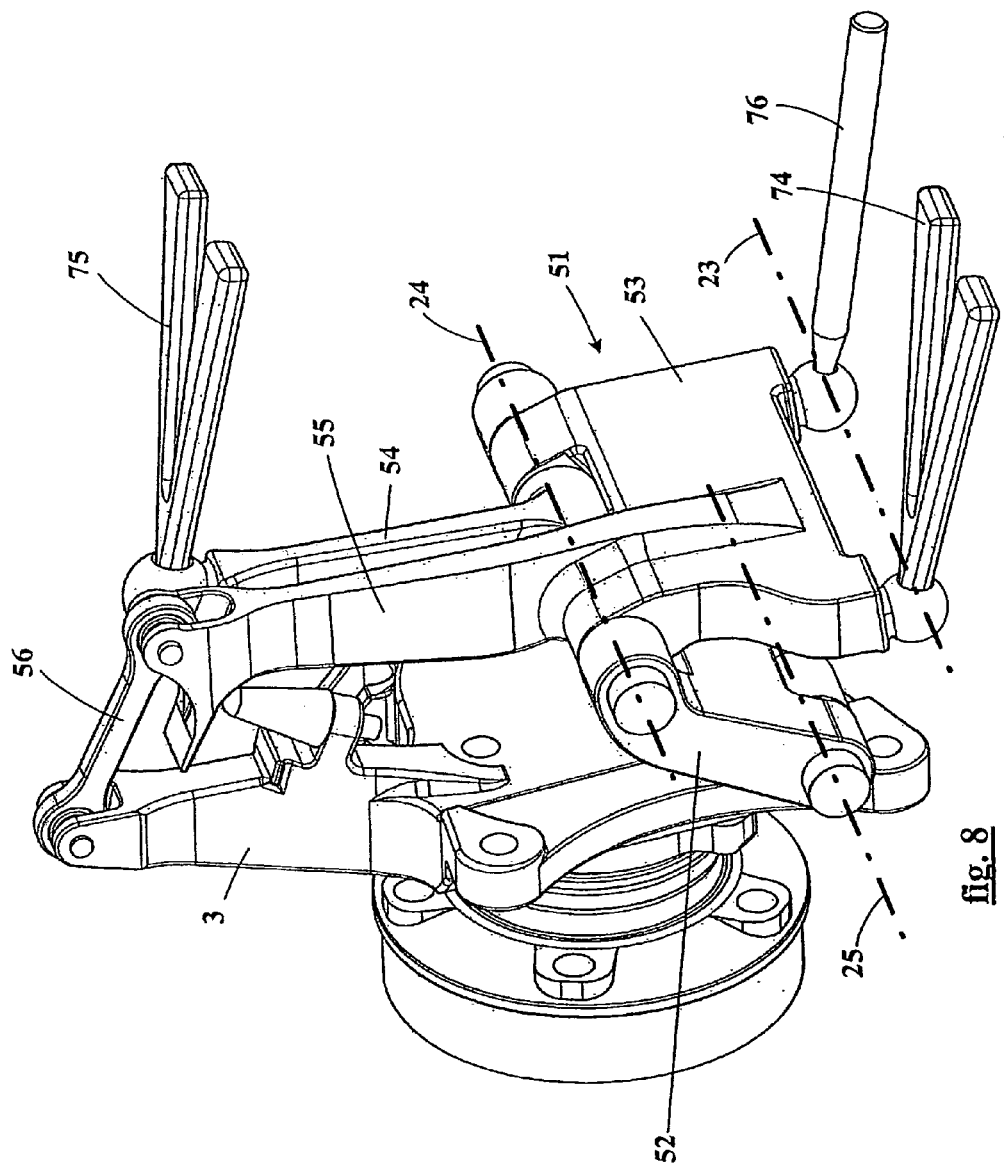
FIG. 8: Perspective view of another embodiment of the support system according to the invention.

FIG. 8 shows another embodiment of the support system according to the invention. Its main particularity is that it is connected directly to the suspension arms and/or wishbones without any intermediate support or inner rod (see indexes 4 and 57 in FIG. 6). An advantage is thus a smaller number of components and links. This simplification is made possible because the relative vertical mobility of the lower 74 and upper 75 arms or wishbones can be used to compensate the distance variation between the lower attachment point to the inner flange 53 and the upper one to the lever 54 coming from the outer flange 52 of the support system of the invention. The position of the instantaneous centre of rotation of the camber movement can be defined in the manner described in FIG. 3 provided that the upper wishbone 75 is regarded as replacing the inner rod (indexed 57 in FIG. 3). Preferably, the suspension spring (not shown) rests against the lower wishbone 74.

Figure 9:
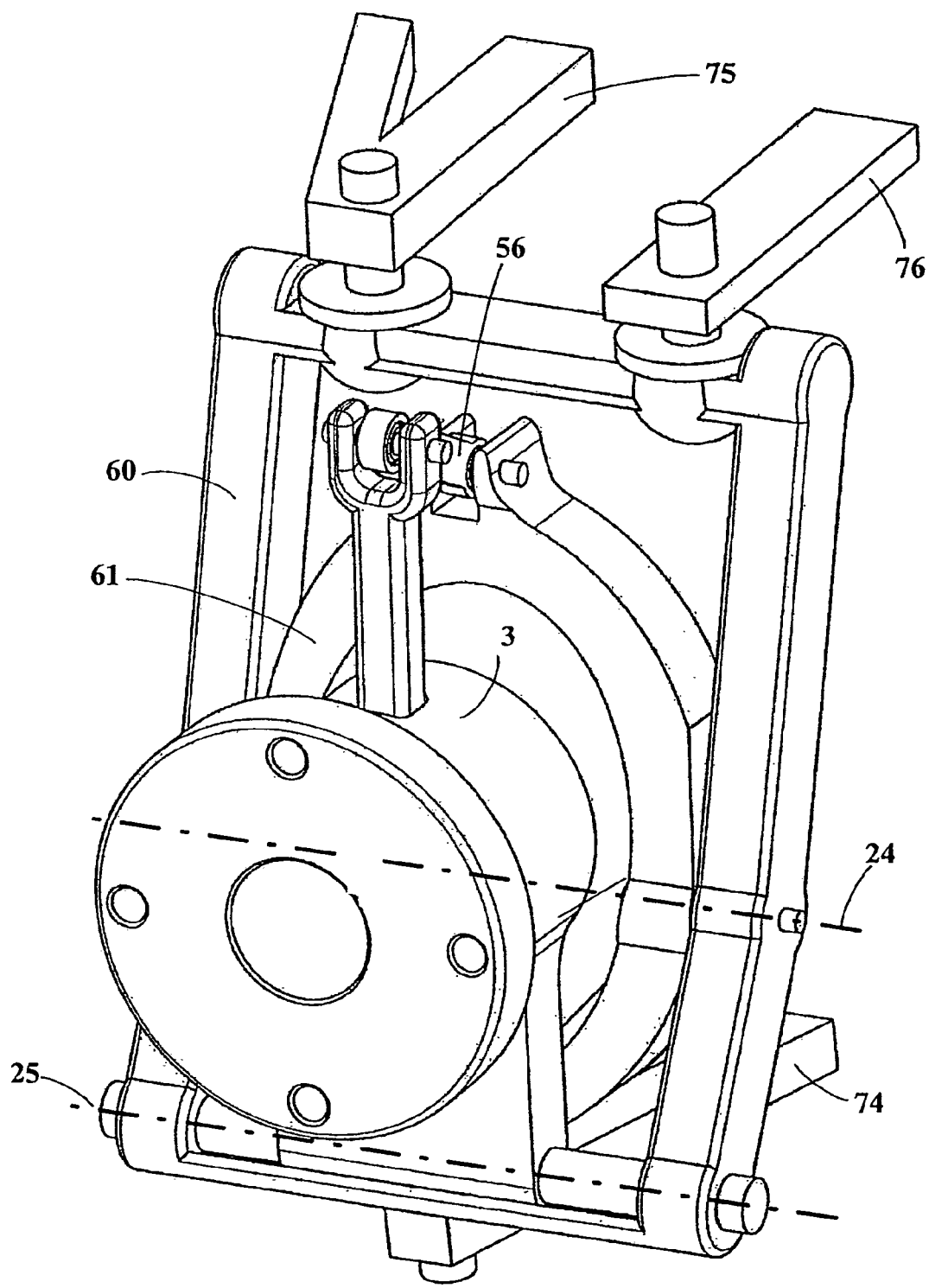
FIGS. 9 and 10: Perspective views of another embodiment of the system according to the invention.
Figure 10:
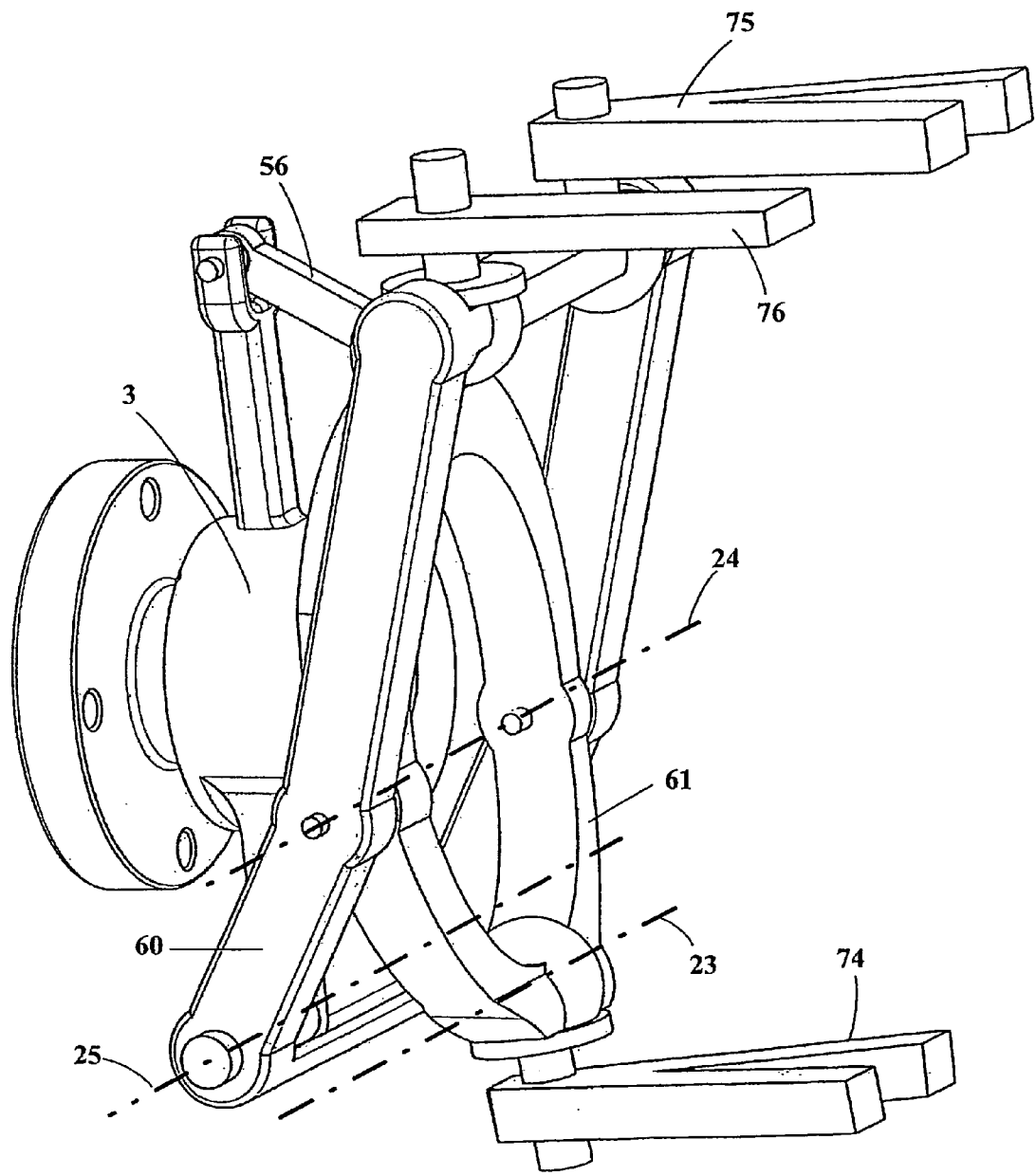

FIGS. 9 and 10 show an embodiment similar to that of FIG. 8. The kinematic principle is the same, that of a pair of scissors (60, 61) which guides the camber movement of the wheel support 3 relative to the suspension elements (74, 75 and 76). The position of the instantaneous centre of rotation of the camber movement can be defined as in FIG. 3 if the upper elements (wishbone 75 and rod 76) are regarded as replacing the inner rod (indexed 57 in FIG. 3).

In this embodiment, however, the spin or self-alignment forces are not taken up exclusively by the lower part of the scissors (i.e. by the triple hinge) because in this embodiment the triple hinge comprises a point connection in place of one of its lateral axes (the inner axis 23 in FIG. 7). Thus, a substantial fraction of the forces is transmitted by the outer frame 60 (which constitutes one branch of the scissors) directly from the lower part of the wheel support 3 to the upper arms and/or wishbones (75, 76). The inner frame 61 (which constitutes the other branch of the scissors) connects the lower arm or wishbone (here a lower wishbone 74) to the upper part of the wheel support 3 via a rod 56 as before. The arm 76 can be a steering rod in the case of a steering axle or a track rod in the case of a multi-arm non-steering axle. With a non-steering axle a trapezium can also replace the wishbone (75) and rod (76) assembly. A transmission shaft can pass through the centre of the device.

An advantage of this embodiment is that the steering forces (from the self-alignment torque) are transmitted by a single axis (the outer axis 25) instead of by two axes in the example of FIG. 8 or three axes as in the examples of FIGS. 1 to 7.

Figure 11:
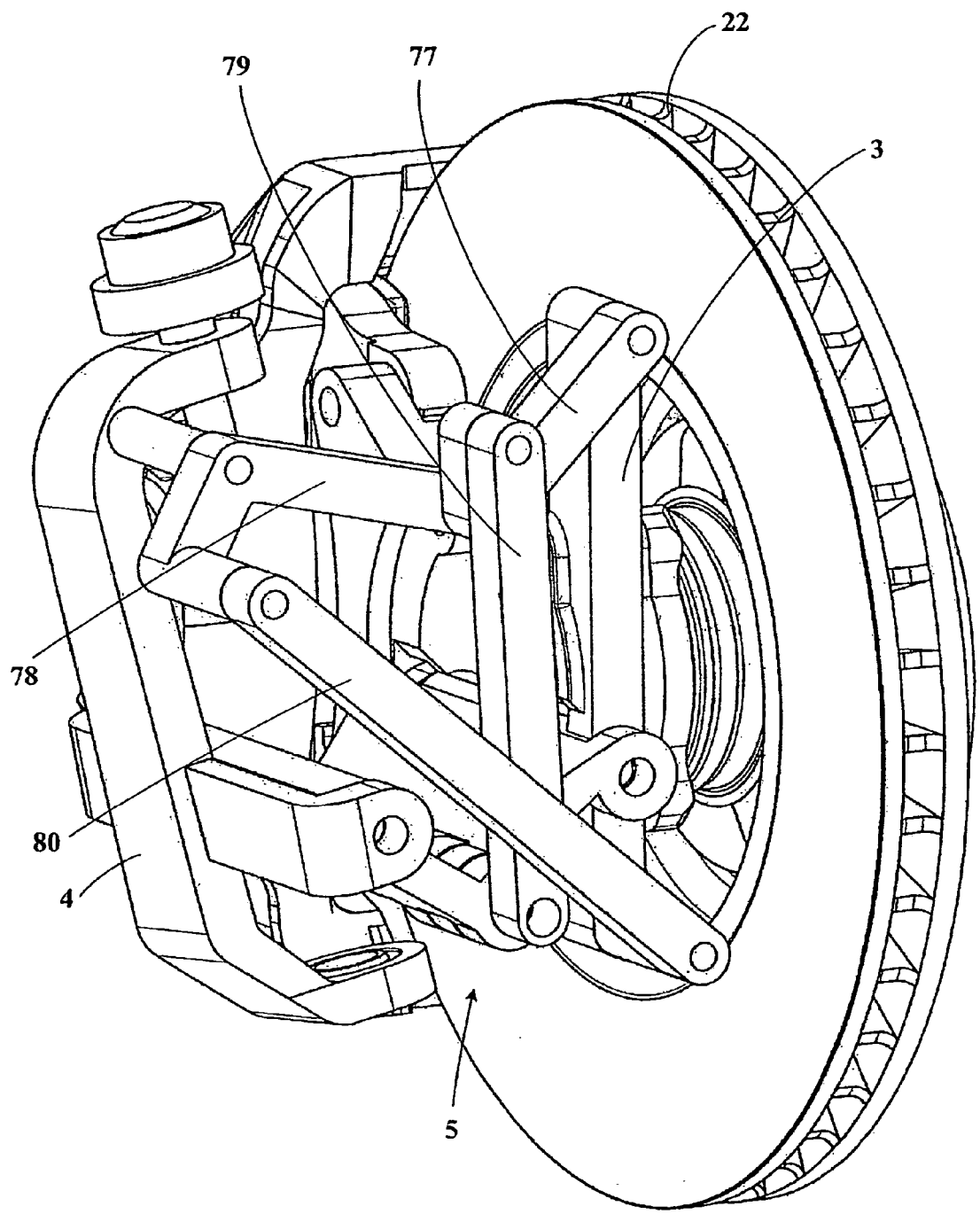
FIG. 11: Perspective view of another embodiment of the support system according to the invention.

FIG. 11 shows another embodiment which is easy to compare with that of FIG. 1. In this embodiment the function of guiding the camber movement is carried out not by a curved slide (as in FIG. 1) but by a second hinge (77, 78) whose movements are linked to those of the triple hinge 5 by a rod 79. It is clear that the dimensions and positions of the various elements determine the camber kinematics and in particular the (variable) position of the instantaneous centre of rotation. A load rod 80 ensures that in particular the vertical forces of the wheel support 3 are taken up towards the intermediate support 4.

Figure 12:
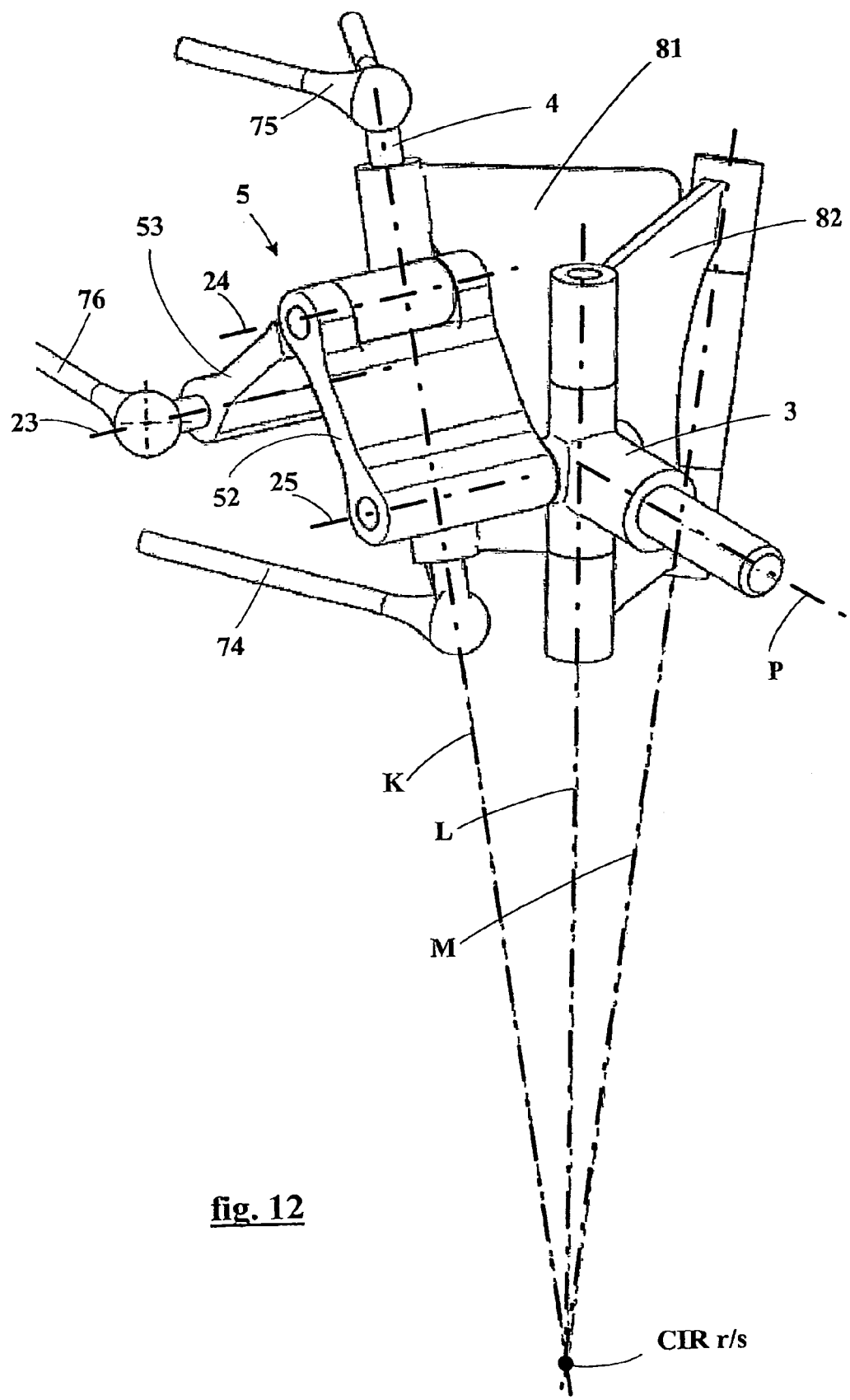
FIG. 12: Perspective view of another embodiment of the support system according to the invention.

FIG. 12 shows another embodiment of the support system according to the invention. In this example a triple hinge 5 such as that described in FIG. 1 (but inverted) is combined with other special means for guiding the camber movement. In effect, the camber movement is guided by a second, essentially vertical triple hinge. The three axes (K, L, and M) of this second hinge cooperate to define the instantaneous centre of rotation (CIR r/s). This camber guiding principle by the rotation of intermediate elements about essentially vertical axes is derived from the principle described in application EP 1247663.

The intermediate support 4 is connected to the vehicle (not shown) by lower 74 and upper 75 wishbones and by a track rod or steering rod 76, in a manner known as such. A first vertical flange 81 is articulated relative to the intermediate support 4 along an axis K which is essentially vertical. A second vertical flange 82 is articulated relative to the first along an axis M which is also essentially vertical. The wheel support 3 is articulated relative to the second flange 82 along an also essentially vertical axis L. The wheel support 3 is designed to carry a wheel on its axis P. Preferably, the three axes K, L and M combine to define the instantaneous centre of rotation (CIR r/s) of the camber movement. An advantage of this embodiment is that it enables the definition of an instantaneous centre of rotation whose position does not vary during the camber movement.

The term "triple hinge" used in this application denotes a mechanical arrangement comprising at least three essentially parallel rotation axes and at least two flanges that enable the connection of two components (the wheel support and the vertical suspension) and allow an essentially planar relative movement (i.e. a translation) between these two components. In the embodiments in which guiding in the camber plane is not effected by the triple hinge (see FIGS. 1, 11 and 12), a triple hinge comprising more than three axes can be used without appreciably modifying the operation of the system. This may be advantageous from the standpoint of space occupied. On the other hand, when guiding is effected by the scissors principle (i.e. by the triple hinge as in FIGS. 2 to 10), it is clear that adding axes beyond the minimum number of three will affect the kinematic definition.

It is also understood that to enable the connecting function of the triple hinge, its axes must be essentially parallel to one another and longitudinal. Depending on the means used for guiding the camber, this parallelism may not be essential or it can be more or less precise. If the axes are not exactly parallel, the camber movement will be coupled with steering or spinning movements. Such coupling may be of interest.

We claim:

1. A wheel support system adapted to connect a wheel to suspension elements of a vehicle, the wheel support system comprising:
    a triple hinge having at least three essentially longitudinal axes, the triple hinge being connected on the one hand to a wheel carrier and on the other hand to the suspension elements; and
    cambering means that confers upon the wheel carrier a degree of camber freedom relative to the suspension elements,
    wherein the wheel carrier and the suspension elements are spaced from each other but coupled via the triple hinge and the cambering means interposed therebetween.

2. A wheel support system according to claim 1, in which the triple hinge has only three essentially longitudinal axes and operates along said three axes.

3. A wheel support system according to claim 2, in which the three axes are parallel.

4. A wheel support system according to claim 2, in which the triple hinge comprises two flanges, and wherein said cambering means comprises two levers being fixedly attached respectively to the two flanges, and the camber movement being controlled by the movement of said levers.

5. A suspension system comprising the wheel support system according to claim 4, said suspension system also comprising at least one upper arm and one lower arm and in which the lower arm is connected directly to the an inner flange from said two flanges of the triple hinge and the upper arm is connected directly to one of said levers that is attached to an outer flange from said two flanges of the triple hinge.

6. A wheel support system according to claim 1, further comprising a camber damper that acts between the wheel carrier and the suspension elements.

7. A wheel support system according to claim 1, further comprising means for guiding the camber movement, configured in such manner that the movement of the wheel carrier relative to the suspension elements has an instantaneous centre of rotation about a mean position, located below ground level.

8. A wheel support system according to claim 7, wherein said camber movement guiding means is configured such that the instantaneous center of rotation is located in the wheel plane when the wheel is in the mean position.

9. A suspension system comprising the wheel support system according to claim 1.

10. A wheel support system adapted to connect a wheel to suspension elements of a vehicle, the wheel support system comprising:
    a triple hinge having first, second and third essentially longitudinal axes and comprising a first member which is rotatably connected to a wheel carrier at the first essentially longitudinal axis, and a second member which is rotatably connected to the suspension elements at the second essentially longitudinal axis, the first member and the second member being rotatably connected to each other at the third essentially longitudinal axis; and
    cambering means responsive to relative motion between the wheel carrier and the suspension elements for varying position of the first and second members relative to each other around said third essentially longitudinal axis to confer upon the wheel carrier a degree of camber freedom relative to the suspension elements,
    wherein the wheel carrier and the suspension elements are spaced from each other but coupled via the triple hinge and the cambering means interposed therebetween.

* * * * *